(12) United States Patent
Mergler et al.

(10) Patent No.: US 8,199,659 B2
(45) Date of Patent: Jun. 12, 2012

(54) COMMUNICATION DEVICE AND METHOD OF COMMUNICATION USING WIRELESS COMMUNICATION PROTOCOL

(75) Inventors: Iwo-Martin Mergler, Miranda (AU); Michael James, Hamble (GB)

(73) Assignee: NXP B.V., Eindhoven (NL)

( * ) Notice: Subject to any disclaimer, the term of this patent is extended or adjusted under 35 U.S.C. 154(b) by 447 days.

(21) Appl. No.: 11/813,992

(22) PCT Filed: Jan. 10, 2006

(86) PCT No.: PCT/IB2006/050092
§ 371 (c)(1),
(2), (4) Date: Mar. 12, 2010

(87) PCT Pub. No.: WO2006/075294
PCT Pub. Date: Jul. 20, 2006

(65) Prior Publication Data
US 2010/0157817 A1    Jun. 24, 2010

(30) Foreign Application Priority Data

Jan. 13, 2005 (GB) .................................. 0500601.0

(51) Int. Cl.
*H04J 1/16* (2006.01)
*H04N 7/18* (2006.01)
(52) U.S. Cl. .......................................... 370/252; 725/78
(58) Field of Classification Search .................. None
See application file for complete search history.

(56) References Cited

U.S. PATENT DOCUMENTS

| 6,931,659 B1 * | 8/2005 | Kinemura .................... 725/111 |
| 2003/0142631 A1 * | 7/2003 | Silvester ..................... 370/252 |
| 2004/0077310 A1 * | 4/2004 | Levy .............................. 455/7 |
| 2004/0125820 A1 * | 7/2004 | Rios ............................. 370/480 |
| 2004/0187156 A1 * | 9/2004 | Palm et al. ..................... 725/81 |
| 2005/0034159 A1 * | 2/2005 | Ophir et al. .................... 725/78 |
| 2005/0068915 A1 * | 3/2005 | Atad et al. .................... 370/316 |
| 2006/0019679 A1 * | 1/2006 | Rappaport et al. .......... 455/456.5 |

FOREIGN PATENT DOCUMENTS

| CN | 1429026 A | 7/2003 |
| EP | 1 182 791 A2 | 2/2002 |
| EP | 1182791 A2 | 2/2002 |
| EP | 1182791 A3 | 8/2003 |
| EP | 1 414 241 A1 | 4/2004 |
| EP | 1414241 A1 | 4/2004 |
| EP | 1 460 873 A1 | 9/2004 |
| EP | 1460873 A1 | 9/2004 |
| WO | 2004/015902 A2 | 2/2004 |
| WO | WO2004015902 A2 | 2/2004 |
| WO | WO2004015902 A3 | 2/2004 |

OTHER PUBLICATIONS

Bektas, F. et al. "Antenna Diversity Techniques for Bluetooth Communication," WiOpt'03: Modeling and Optimization in Mobile, Ad Hoc and Wireless Networks, 6 pgs. (2003).

* cited by examiner

*Primary Examiner* — Clemence Han

(57) ABSTRACT

A communication device (9) has a Wi-Fi® device (14) for communicating with another communication device (9). The Wi-Fi® device (14) has one output connected to an antenna (13) and another output connected to a coaxial cable jack (10) via a coupler (11). The antenna (13) therefore provides a wireless communications link and the coupler (11) provides a wired communications link. A diversity switch (18) of the Wi-Fi® device (14) uses antenna diversity switching provided for in the Wi-Fi® standards to switch between the wireless communications link and the wired communications link.

20 Claims, 3 Drawing Sheets

COMMUNICATION DEVICE AND METHOD OF COMMUNICATION USING WIRELESS COMMUNICATION PROTOCOL

This invention relates to a communication device and a method of communication using a wireless communication protocol. A particular, but not exclusive, application of the invention is a communication device for transmitting a Wi-Fi® signal via a wireless link or a wired link to another communication device.

Wi-Fi® is becoming ubiquitous in both homes and offices around the world. It is a wireless communication protocol for Wireless Local Area Networks (WLANs) based on the Institute of Electrical and Electronics Engineers (IEEE) 802.11 specifications, which can be found at http://standards.ieee.org. Basically, Wi-Fi® allows communication devices to transmit data to one another via wireless links between their antennas on an ad hoc basis. At present, Wi-Fi® is usually used for communications between Personal Computers (PCs); between a PC and a printer; or between a PC and a Wireless Access Point (WAP) for allowing access to a wired network. However, the use Wi-Fi® is rapidly expanding to other applications. In particular, it is expected that home media systems will increasingly make use of Wi-Fi® to send audio and audio-visual data such as the content of radio and television signals between the components of home media systems, such as set top boxes, televisions, games consoles, DVD players and such like.

However, as the use of Wi-Fi® and other such wireless communication protocols increases, so do concerns about their reliability. Wi-Fi® uses two frequency bands, at around 2.4 GHz and 5 GHz, which can be divided up into a small number of channels, each of which naturally has only limited bandwidth. The latest versions of Wi-Fi® are able to use this limited bandwidth to transmit data rapidly enough that the audio visual data content of a television signal or such like can be streamed between communication devices in real time. For example, the IEEE 802.11g standard and the proposed IEEE 802.11n standard have maximum data rates of around 54 Mbps. However, this is only possible in good transmission conditions, e.g. when there is little or no interference. As transmission conditions degrade, the speed of data transmission quickly falls.

More specifically, Wi-Fi® is a contention based service. This means that as communication devices near to one another attempt to communicate over an increasing number of different communication links, the available bandwidth is split more and more finely between the different required communication links to allow them all to be accommodated. This bandwidth splitting reduces the maximum data rate of each communication link. Indeed, using the 802.11g standard, the maximum data rate of 54 Mbps can only usually be achieved in a single communication link between two communication devices, in the absence of any other Wi-Fi® signals in the same frequency band. So, in the home, only one communication link is likely to be achievable at the maximum data rate at any one time. As more Wi-Fi® communication devices are introduced into the home, the speed of communication between all the Wi-Fi® devices in the home falls.

Like all wireless communication, Wi-Fi® is also susceptible to path loss and interference. More specifically, Wi-Fi® only allows transmissions at relatively low power, capable of achieving a maximum distance of around 300 m in good transmission conditions. Inside the home, walls, fixtures and fittings and the positioning of the communication devices can severely attenuate the Wi-Fi® signals. As the strength of a Wi-Fi® signal falls, it tends to contain more errors. Likewise, Wi-Fi® signals tend to interfere with one another. So, as more communication devices attempt to communicate with one another using Wi-Fi®, interference between the different communication links increases, again introducing errors in the transmission. In particular, separation between different Wi-Fi® channels is fairly limited, with the result that Wi-Fi® signals in adjacent channels can significantly interfere with one another, again causing communication errors. To mitigate for these errors, data packets can be sent between two communication devices more than once, but this reduces the overall rate of data transmission between the devices. At worst, no Wi-Fi® signal can be received and no communication is possible.

Of course, the effects of bandwidth contention and interference are not limited to devices located within the home. Rather, Wi-Fi® signals from all nearby communication devices, e.g. in a neighbouring home, are likely to influence communication within the home. So, the proliferation of Wi-Fi® technology throughout neighbourhoods has a generally detrimental effect on the speed of Wi-Fi® communication.

The applicants have therefore recognised that, whilst Wi-Fi® communication devices are likely to be able to continue to meet the needs of some data communication in the home, such as the sharing of data between PCs, they are unlikely to be able to meet the demand all desired communication. In particular, transmitting multiple audio and audio-visual data signals between components of a home media system using Wi-Fi® is unlikely to be achievable. Rather, the applicants consider it likely that wired communication will continue to be required to achieve this. However, whilst wired communication is not particularly problematic where suitable wiring is already in place, as in most offices and some modern homes, or over very short distances, adding new wiring around the home (e.g. between different rooms) is generally inconvenient. In particular, adding wiring to support conventional wired communication protocols, such as those used in conventional wired Ethernet technology, is likely to be undesirable in most homes. Furthermore, whilst PCs and such like may commonly include such wired networking technology, including it in the different components of a home media system is expensive.

The present invention seeks to overcome these problems.

According to a first aspect of the present invention there is provided a communication device for transmitting a communication signal to another communication device via a wireless link or a wired link using a wireless communication protocol, wherein the communication device uses the wireless communication protocol to monitor the quality of a communication signal it receives from the other communication device via the wireless link and the wired link and to switch between transmission of the communication signal to the other communication device via the wireless link and transmission of the communication signal to the other communication device via the wired link according to the monitored signal quality.

According to a second aspect of the present invention there is provided method of communication comprising transmitting a communication signal from one communication device to another communication device via a wireless link or a wired link using a wireless communication protocol, wherein the one communication device uses the wireless communication protocol to monitor the quality of a communication signal it receives from the other communication device via the wireless link and the wired link and to switch between transmission of the communication signal to the other communication device via the wireless link and transmission of the communication signal to the other communication device via the wired link according to the monitored signal quality.

So, the applicants have recognised that a wireless communication protocol can be used to for communication over a wired link as well as a wireless link. The wired link is likely to provide a better transmission path than the wireless link. So, by switching between the wired link and the wireless link according to a signal quality estimation, the wired link is most likely to be selected. However, should the wired link be unplugged or be damaged, communication can be maintained using the wireless link.

This has a number of advantages. For example, the wired link tends to be less susceptible to interference than the wireless link. The reliability of communication between the communication devices is therefore improved. Similarly, unlike wireless links, wired links are generally private. This makes it less likely that the signal will be hijacked by an unauthorised user, improving security. Importantly, where there is high demand for wireless communication capacity, the signal transmitted over the wired link also causes very little interference with other signals transmitted over wireless links. Overall transmission capacity is therefore improved.

The invention is also cheap to implement, as the wireless communication protocol is used for both the wired link and the wireless link rather than two separate communication technologies. For example, wireless communication protocols commonly incorporate antenna diversity switching to select between wireless links provided by more than one antenna and the applicants have recognised that this antenna diversity switching can be used to switch between the wired link and the wireless link.

Any wireless communication protocol might be suitable for implementing the invention. For example, Bluetooth® communication might benefit from the invention. However, it is generally expected that the invention will be implemented using Wi-Fi®. In other words, it is preferred that the wireless communications protocol is Wi-Fi® or in accordance with an IEEE 802.11 standard, but the invention is not limited to this. So, whilst the monitoring of signal quality is may be carried out in a variety of ways, it typically comprises estimating a signal to noise ratio or a received signal strength indication for the received communication signal, as in the Wi-Fi® standards.

The invention is particularly advantageous when existing cabling can be used for the wired link. This might be the case in a home or office when cabling for broadcast television signals can be used. In other words, the wired link may also carry broadcast television signals. Similarly, the wired link may be a coaxial cable. Indeed, the applicants have recognised that coaxial cabling provides a good transmission medium for Wi-Fi® signals and that Wi-Fi® signals can coexist with broadcast television signals on a coaxial cable without significant interference.

The wired link might be a single coaxial cable extending between the communication devices. Alternatively, the wired link may extend over several coaxial cables. In particular, it is envisaged that the wired link may need to extend across a distribution amplifier for amplifying and distributing a received broadcast television signal to more than one television receiver. So, the wired link may comprise a wired connection between the communication devices via a distribution amplifier for amplifying a broadcast television signal and distributing it to the communication devices via the wired connection, wherein the distribution amplifier has a circuit for passing the communication signals between the communication devices. Such as distribution amplifier is considered to be new in itself and, according to a third aspect of the present invention, there is provided a distribution amplifier comprising:

an amplifier for amplifying a broadcast television signal received by the distribution amplifier;

a distribution circuit for distributing the amplified broadcast television signal to two or more television receivers;

and a circuit for passing a communication signal transmitted by a communication device of one of the television receivers using a wireless communication protocol to a communication device of another of the television receivers from the one communication device to the other.

Also, according to a fourth aspect of the present invention, there is provided a method of amplifying and distributing a broadcast television signal, the method comprising:

amplifying the broadcast television signal;

distributing the amplified broadcast television signal to two or more television receivers;

passing a communication signal transmitted by a communication device of one of the television receivers using a wireless communication protocol to a communication device of another of the television receivers from the one communication device to the other.

So, the distribution amplifier allows the communication signals or Wi-Fi® signals to bypass the amplifier. The communication signals can therefore pass by the distribution amplifier substantially without alteration.

It can be appreciated that the communication devices may form part of any suitable communication network. However, it is particularly envisaged that they will be incorporated in a home media system. To this end, the communication device (s) may, for example, be incorporated in a television receiver. The television receiver may be a set top box, home media centre, or a television. Alternatively, it may be a device for recording television signals, such as a Hard Disc Drive (HDD) recorder or a Digital Versatile Disc (DVD) recorder. In yet further alternatives, the communications device may be incorporated in other components of a home media system, such as a games console or audio amplifier.

Preferred embodiments of the invention will now be described, by way of example only, with reference to the accompanying drawings, in which.

Figure 1:
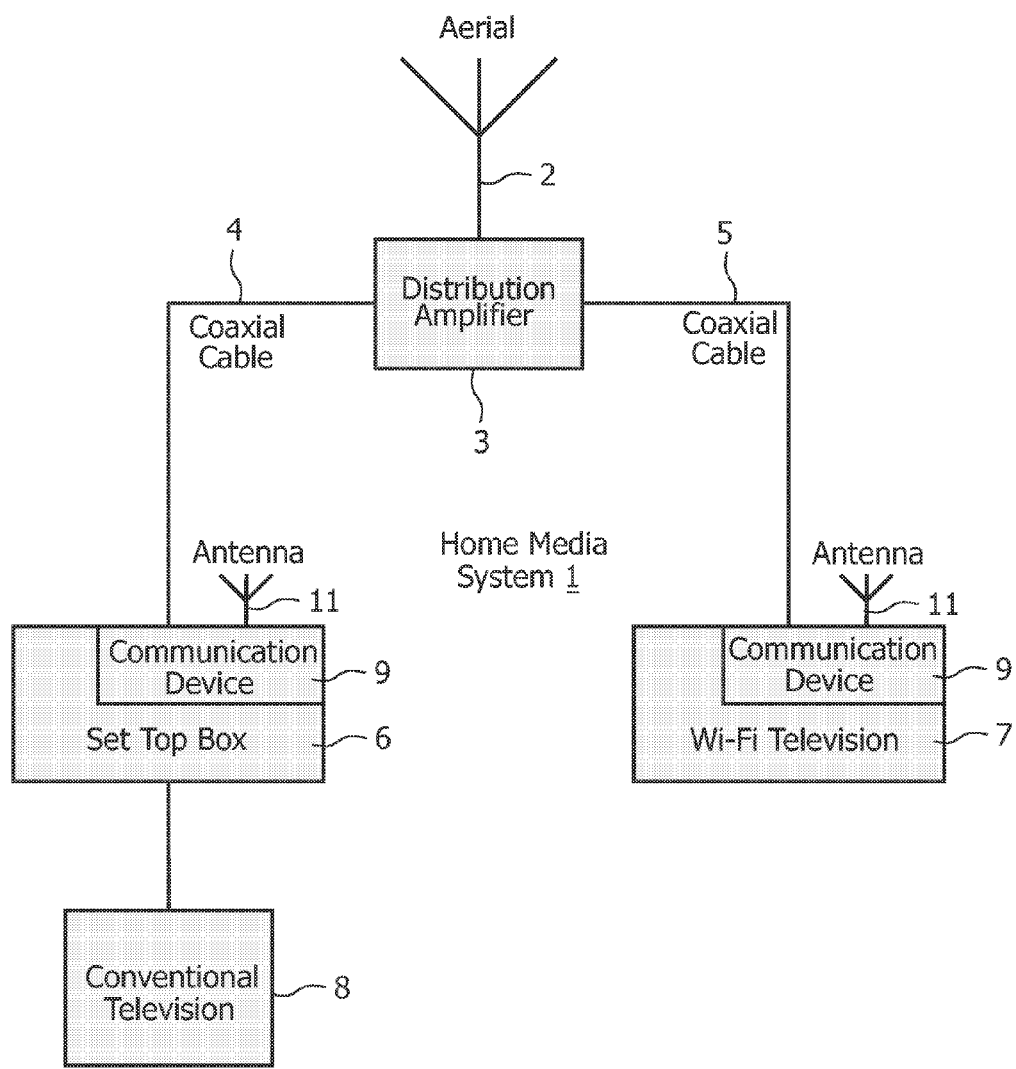
FIG. 1 is a schematic illustration of a home media system incorporating the invention.

Referring to FIG. 1, a home media system 1 has an aerial 2 for receiving broadcast television signals. In this embodiment, the received broadcast television signals are digital television signals broadcast over the air by a terrestrial broadcast system and received over a conventional household television aerial. However, the invention is not limited to this and, in other embodiments, the television signals could be broadcast via satellite, cable or any other suitable medium. The aerial 2 can therefore be replaced by a satellite dish, cable connection or such like, as appropriate, and appropriate modifications can be made to the embodiments of the invention described below.

The aerial 2 is connected to a distribution amplifier 3 for amplifying the received broadcast television signals and distributing them via coaxial cables 4, 5 to a set top box 6 and a Wi-Fi® television 7 of the home media system 1. The set top box 6 is able to receive and decode the broadcast television signals received from the aerial 2 via the distribution amplifier 3. Indeed, in this embodiment, the set top box 6 has multiple tuners and decoders (not shown) for selecting channels of the received television signals and decoding the signals in the selected channels. It also has a recorder (not shown) for selectively recording the content of the decoded television signal(s), which in this embodiment comprises a Hard Disk Drive (HDD) recorder, as well as a media player for reading and outputting audio and audio-visual data from conventional media, such as Digital Versatile Discs (DVDs) or such like. The set top box 6 is connected to a conventional television 8 to which it can output the decoded television signal of a selected channel, a recorded television signal or audio or audio-visual data read from a DVD or such like. Such a set top box 6 is often referred to as a "home media centre".

The Wi-Fi® television 7 is again able to receive and decode broadcast television signals received from the aerial 2 via the distribution amplifier 3. However, in this embodiment, the Wi-Fi® television 7 only has limited decoding functionality in comparison to set top box 6, which means that in order to output television signals in certain channels, it must receive the signals via set top box 6. To this end, the set top box 6 and the Wi-Fi® television 7 each have a communication device 9. The communications devices 9 of the set top box 6 and the Wi-Fi® television 7 are identical to one another and just one is therefore described below.

Figure 2:
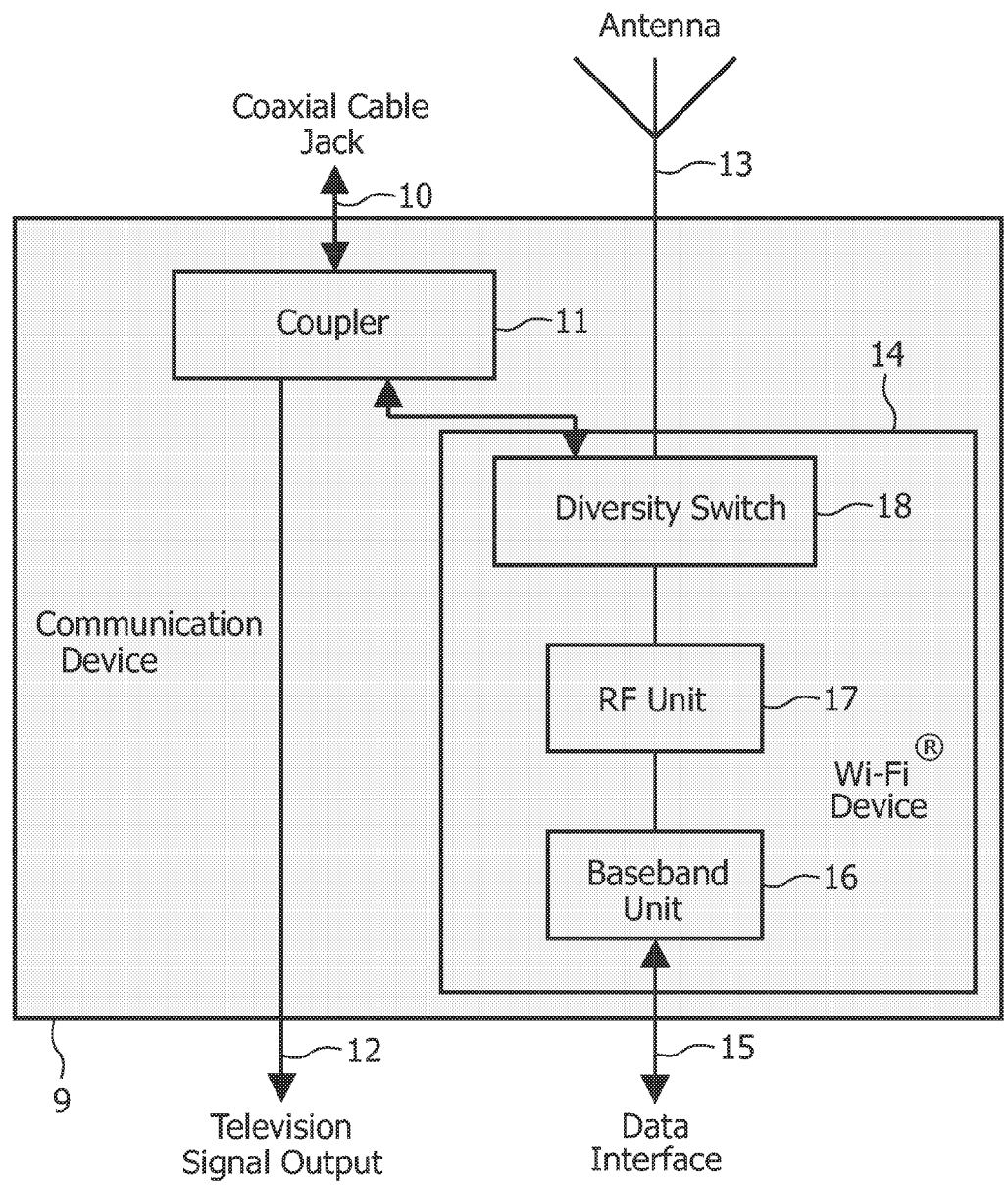
FIG. 2 is an illustration of a communication device of the home media system shown in FIG. 1.

Referring to FIG. 2, the communication device 9 has a coaxial cable jack 10 for connection to the coaxial cable 4 between the distribution amplifier 3 and the set top box 6 or the coaxial cable 5 between the distribution amplifier 3 and the Wi-Fi® television 7. The jack 10 is connected to a coupler 11, which provides a direct path to a television signal output 12 for the television signals received over the coaxial cable 4, 5. So, both the set top box 6 and the Wi-Fi® television 7 can receive television signals from the distribution amplifier 3 via their communication device 9 and, more specifically, the coaxial cable jack 10, coupler 11 and television signal output 12 of their communication device 9.

The communication device 9 also has an antenna 13 for the transmission and reception of communication signals over a wireless link. The antenna 13 is connected to a Wi-Fi® device 14 of the communications device 9 for handling the transmission and reception of the communication signals. The Wi-Fi® device 14 is in turn connected to a data interface 15 for outputting data to and receiving data from the set top box 6 or the television 7. The Wi-Fi® device 14 is basically conventional, in that is complies with any one of the IEEE 802.11 standards. It is not therefore described in detail in this document. However, it schematically comprises a baseband unit 16 for handling the exchange of data with the set top box 6 or Wi-Fi® television 7 over the data interface 15 and a radio frequency (RF) unit 17 for handling the transmission and reception of communication signals over the wireless link.

Importantly, connected between the RF unit 17 and the antenna 13, the Wi-Fi® device 14 has a diversity switch 18. This switch 18 is a diode switch operable to select one of a plurality of wireless communication links, e.g. via different antennas, according to signal quality over the links, in accordance with the IEEE 802.11 standards. However, in this embodiment of the invention, the communication device 9 only has one antenna 13 and the diversity switch has one output connected to that antenna 13 and another output connected to the coupler 11. The coupler 11 has a passive circuit for matching the output of the switch 18 to the coaxial cable 4, 5 connected to the coaxial cable jack 10. The switch is therefore operable to select either the antenna 13 (e.g. a wireless link) or the coupler 11 (e.g. a wired link) for transmission and reception of the communication signals.

Figure 3:
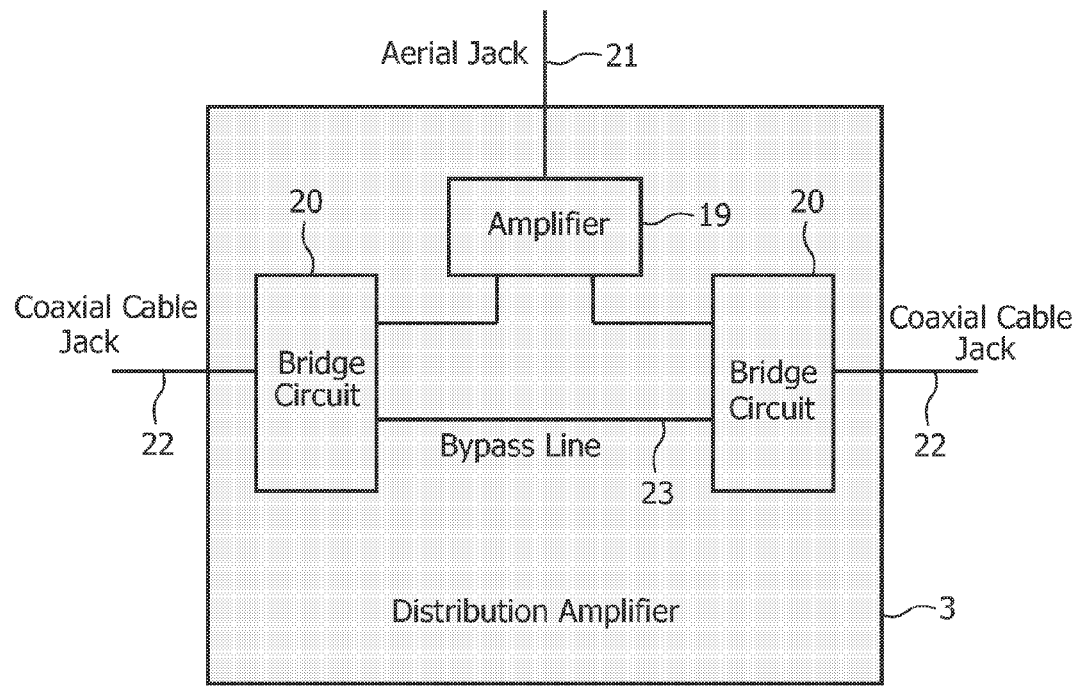
FIG. 3 is a illustration of a distribution amplifier of the home media system shown in FIG. 1.
Figure 4:
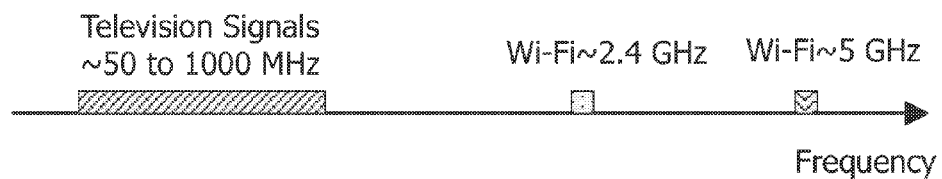
FIG. 4 is a graphical illustration of the frequency range of television signals and communication signals used by the home media system shown in FIG. 1.

Referring to FIG. 3, the diversity amplifier 3 has an aerial jack 21 for connection to the aerial 2 via another coaxial cable. It also has two coaxial cable jacks 22 for connection to coaxial cables 4, 5 of the set top box 6 and the Wi-Fi® television 7. The diversity amplifier 3 has an amplifier 19 for amplifying the television signals received via the aerial 2, as conventional. The output of the amplifier 19 is split between two bridge circuits 20. Each bridge circuit 20 outputs the amplified television signals to one of the coaxial cable jacks 22. The bridge circuits 20 are also connected to one another via bypass line 23 to allow communication signals to pass between the communications devices 9 of the set top box 6 and the Wi-Fi® television 7 via the coaxial cables 4, 5. In other words, the bridge circuits 20 and bypass line 23 allow the communication signals to bypass the amplifier 19. In some embodiments, the bridge circuits 20 therefore have filters or such like (not shown) for separating the broadcast television signals from the communication signals. However, referring to FIG. 4, the television signals are received at the aerial 2 in a frequency band between around 50 and 1000 MHz and the Wi-Fi® signals are transmitted in one of two frequency bands at around 2.4 GHz and 5 GHz. The higher frequency Wi-Fi® signals transmitted over the coaxial cables 4, 5 do not therefore interfere with the television signals on the cables 4, 5. Furthermore, the coaxial cables 4, 5 provide a low noise transmission environment for the Wi-Fi® signals.

In use, television signals are received via the aerial 2 and pass to the distribution amplifier 3. The amplifier 19 of the distribution amplifier 3 amplifies the received television signals and distributes the amplified signals via bridge circuits 20 and coaxial cables 4, 5 to set top box 6 and Wi-Fi® television 7. The television signals are received at the coaxial cable jack 10 of the communication devices 9 of the set top box 6 and Wi-Fi® television 7, from where they pass via coupler 11 to television signal output 12. The set top box 6 and Wi-Fi® television 7 therefore receive the broadcast television signals via their communication devices and can both select a channel of the received television signals, decode the signal and output the content of the television signals as desired.

However, from time to time it may be desired for the set top box 6 to output an audio or audio-visual data to the Wi-Fi® television 7. This data might, for example, be the content of a television signal that the Wi-Fi® television 7 is unable to decode, but that the set top box can decode, e.g. because it has an appropriate decryption device; the content of a television signal recorded by the set top box 6; the content of a DVD; or such like. In order to achieve this, the communication device 9 of the set top box 6 establishes a communication link with the communication device 9 of the Wi-Fi® television 7. The set top box 6 then outputs the audio or audio visual data to its communication device 9 via the data interface 15 and the communication device 9 of the set top box 6 transmits the data to the communications device 9 of the Wi-Fi® television 7 in communications signals over the communication link.

The communication signals between the two communication devices 9 are transmitted in accordance with the IEEE 802.11 standards. In particular, the communication signals comprise data packets that have a pilot sequence used for synchronisation and such like. During receipt of the pilot sequences, the diversity switch 18 of each communication device 9 is toggled between the antenna 13 and the coupler 11 (i.e. the coaxial cables 4, 5). The RF unit 17 measures the signal quality of the pilot sequence received via the antenna 13 and coupler 11 and whichever of the antenna 13 and the coupler 11 provides the best signal quality is used for receipt of the data packet. More specifically, in accordance with the IEEE 802.11 standard 1999, a Physical Medium Dependent (PMD) layer of the RF unit 17 makes a Received Signal Strength Indication (RSSI) estimate for the pilot sequence to provide a "PMD_RSSI.indicate(STRENGTH)" parameter, having a value from 0 to 15, for each of the antenna 13 and coupler 11. From these parameters, an "ANTENNA_STATE" parameter having a value corresponding to the antenna 13 or the coupler 11 is generated and this parameter is used to control the diversity switch 18.

As the coaxial cables 4, 5 between the couplers 11 almost invariably provide a lower loss and lower interference signal path that a wireless communication path between the antennas 13, the Wi-Fi® signals are usually sent over the coaxial cables 4, 5, e.g. the "wired" link. However, in the event say that the Wi-Fi® television 7 is disconnected from the coaxial cable 5, the Wi-Fi® signals can be received over the wireless link between the antennas 13. This change is seamless, as it occurs on a packet by packet basis. So, the user retains the flexibility of wireless communication. However, whilst the Wi-Fi® signals are sent over the wired link, they are almost totally immune to interference from other Wi-Fi® signals and do not cause interference themselves. The overall capacity of Wi-Fi® communications is therefore improved.

The described embodiments of the invention are only examples of how the invention may be implemented. Modifications, variations and changes to the described embodiments will occur to those having appropriate skills and knowledge. These modifications, variations and changes may be made without departure from the spirit and scope of the invention defined in the claims and its equivalents.

The invention claimed is:

1. A communication device comprising:
   a coaxial interface configured for connection to a wired link including a coaxial cable;
   a wireless antenna configured for connection over a wireless link;
   a wireless protocol circuit configured to
      transmit a first communication signal to a second communication device via at least one of the wireless link and the wired link using a wireless communication protocol,
      monitor a quality of a second communication signal received using a wireless communication protocol and from the second communication device via the wireless link and the wired link, and
      switch between transmission of the first communication signal to the second communication device via the wireless link and transmission of the first communication signal to the second communication device via the wired link according to the monitored signal quality.

2. The communication device of claim 1, wherein the wireless communication protocol is Wi-Fi®.

3. The communication device of claim 1, wherein the monitored signal quality is a received signal strength indication.

4. The communication device of claim 1, wherein the monitored signal quality is a signal to noise ratio.

5. The communication device of claim 1, wherein the communication device is connected to receive a broadcast television signal over the wired link.

6. The communication device of claim 1, wherein the wired link comprises a coaxial cable.

7. The communication device of claim 1, wherein the wired link to the second communication device comprises a wired connection between the communication devices via a distribution amplifier for amplifying a broadcast television signal and distributing the broadcast television signal to the communication devices via the wired connection, wherein the distribution amplifier has a circuit for passing the communication signals between the communication devices.

8. A network incorporating the communication devices of claim 1.

9. A television receiver incorporating the communication device of claim 1.

10. The communication device of claim 1, wherein the wireless protocol circuit is configured to switch from transmission of the first communication signal to the second communication device via the wired link to transmission of the first communication signal to the second communication device via the wireless link in response to the monitored quality of a second communication signal received via the wired link.

11. A communication system comprising:
   a communication device configured to select one of a wireless communication link and a coaxial communication link based upon a signal quality of a signal received on the coaxial communication link; and
   a distribution amplifier including
      a broadcast television signal input configured to receive a broadcast television signal;
      an amplifier configured to amplify the broadcast television signal;
      a first coaxial interface configured to connect to a wired link including a coaxial cable;
      a second coaxial interface configured to connect to a wired link including a coaxial cable;
      a distribution circuit configured to distribute the amplified broadcast television signal to two or more television receivers over the first coaxial interface and the second coaxial interface; and
      a circuit configured to pass a communication signal received from a first one of the television receivers via the communication device on the first coaxial interface to the second coaxial interface, using a wireless communication protocol, to transmit the communication signal to a communication device of another of the television receivers.

12. A method of communication, the method comprising:
   transmitting a communication signal from one communication device to a second communication device via at least one of a wireless link and a wired link using a wireless communication protocol and;
   at the one communication device,
      using the wireless communication protocol to monitor a quality of a communication signal received from the second communication device via both the wireless link and the wired link, and
      switching transmission of the communication signal to the second communication device between the wireless link and the wired link according to the monitored signal quality.

13. The method of claim 12, wherein the wireless communication protocol is Wi-Fi®.

14. The method of claim 12, wherein the monitored signal quality is a received signal strength indication.

15. The method of claim 12, wherein the monitored signal quality is a signal to noise ratio.

16. The method of claim 12, connected to receive a broadcast television signal over the wired link.

17. The method of claim 12, wherein the wired link comprises a coaxial cable.

18. The method of claim 12, wherein the wired link to the second communication device comprises a wired connection between the communication devices via a distribution amplifier for amplifying a broadcast television signal and distributing the broadcast television signal to the communication devices via the wired connection, wherein the distribution amplifier has a circuit for passing the broadcast television signal between the communication devices.

19. The method of claim 12, wherein switching transmission of the communication signal to the second communication device between the wireless link and the wired link according to the monitored signal quality includes switching the transmission of the communicated signal from the wired link to the wireless link in response to the monitored quality of a communication signal received via the wired link.

20. A method of amplifying and distributing a broadcast television signal, the method comprising:

amplifying the broadcast television signal;

distributing the amplified broadcast television signal to two or more television receivers over a first coaxial interface and a second coaxial interface;

communicating, from a first one of the television receivers to the first coaxial interface, a communication signal using a wireless communication protocol in response to a monitored signal quality of a signal received via both the first coaxial interface and a wireless communications link; and passing the communication signal received on the first coaxial interface to a second one of the television receivers via the second coaxial interface, using the wireless communication protocol to a communication device of another of the television receivers from the one communication device to the other.

* * * * *